United States Patent [19]

Gaku et al.

[11] Patent Number: 4,717,609
[45] Date of Patent: Jan. 5, 1988

[54] ADHESIVE COMPOSITION AND ADHESIVE FILM OR SHEET ON WHICH THE COMPOSITION IS COATED

[75] Inventors: Morio Gaku, Saitama; Nobuyuki Ikeguchi, Ibaraki; Hidenori Kimbara, Tokyo, all of Japan

[73] Assignee: Mitsubishi Gas Chemical Company, Inc., Tokyo, Japan

[21] Appl. No.: 934,944

[22] Filed: Nov. 19, 1986

Related U.S. Application Data

[62] Division of Ser. No. 711,291, Mar. 13, 1985, Pat. No. 4,645,805.

[30] Foreign Application Priority Data

Mar. 14, 1984 [JP] Japan .................................. 59-48459
May 7, 1984 [JP] Japan .................................. 59-90697

[51] Int. Cl.$^4$ .............................................. C08L 67/02
[52] U.S. Cl. ...................................... 428/40; 525/437;
525/438; 525/422; 525/177; 525/176; 525/64;
524/599; 524/604
[58] Field of Search ...................... 525/437, 438, 422;
428/40

[56] References Cited

U.S. PATENT DOCUMENTS

| | | | |
|---|---|---|---|
| 4,110,364 | 8/1978 | Gaku | 528/170 |
| 4,287,014 | 9/1981 | Gaku | 156/306.9 |
| 4,330,669 | 5/1982 | Ikeguchi | 528/289 |
| 4,389,516 | 6/1983 | Sugio | 525/534 |
| 4,496,695 | 1/1985 | Sugio | 525/391 |
| 4,503,186 | 3/1985 | Sugio | 525/63 |

*Primary Examiner*—Patricia A. Short
*Attorney, Agent, or Firm*—Browdy and Neimark

[57] ABSTRACT

An adhesive composition comprising at least
(A) at least one cyanate ester compound selected from the group consisting of:
 (i) polyfunctional aromatic cyanate ester monomers having the formula $$R-O-C\equiv N)_n$$

wherein n is integer of 2–10 and R is an aromatic organic group, the cyanate groups being bonded to an aromatic ring or said aromatic organic group;
 (ii) homoprepolymers of (i) and
 (iii) coprepolymer of (i) and an amine, and
(B) at least one thermoplastic saturated polyester resin which is non-crystalline, substantially non-crystalline or of low crystallinity is disclosed. The adhesive composition has excellent heat resistance, moisture resistance and chemical resistance.

7 Claims, No Drawings

ADHESIVE COMPOSITION AND ADHESIVE FILM OR SHEET ON WHICH THE COMPOSITION IS COATED

This is a division, of application Ser. No. 711,291 filed Mar. 13, 1985, now U.S. Pat. No. 4,645,805.

BACKGROUND OF THE INVENTION

This invention relates to a novel adhesive composition and an adhesive sheet on which the composition is coated. The adhesive composition and the adhesive sheet have excellent heat resistance, moisture resistance, chemical resistance, flexibility, workability, molding property and storage stability.

U.S. Pat. No. 4,110,364 discloses curable resin compositions comprising a cyanate ester compound, and a polyfunctional maleimide, and optionally an epoxy resin or other thermosetting resin monomer or prepolymer. U.S. Pat. No. 3,562,214 discloses curable resin compositions comprising a cyanate ester compound and an epoxy resin.

Incorporation of butadiene-acrylonitrile compolymer into the above polyvinyl acetate into the above compositions (Japanese Patent Publication (kokoku) No. 40179/1982), incorporation of dimer acid-based polyamide into the above compositions (Japanese Patent Publication (kokai) No. 206673/1983), incorporation of 1,2-polybutadiene rubber into the above compositions (U.S. Pat. No. 4,404,330) and incorporation of acryl rubber into the above compositions (U.S. Pat. No. 4,396,745) were also known.

The resin composition into which butadiene-acrylonitrile copolymer, polyvinyl acetate, or dimer acid-based polymer is incorporated have somewhat poor adhering property and moisture resistance in normal state. The resin composition into which thermoplastic polyurethane is incorporated has somewhat poor moisture resistance, and compatibility of the polyurethane to the resin composition is insufficient, and long time storage stability of the composition is bad.

On the other hand adhesive compositions comprising polyester resin itself which is either non-crystalline or of low crystallinity, (i.e., essentially amorphous), or adhesive compositions comprising the polyester and epoxy resin were known. Although these composition have excellent adhering property and flexibility, they are poor in respect of heat resistance, bonding force at elevated temperature and hardness.

SUMMARY OF THE INVENTION

We found that a resin composition comprising a cyanate ester compound and a thermoplastic, saturated polyester resin, which is either non-crystalline or of low crystallinity, (i.e. essentially amorphous), and optionally a polyfunctional maleimide, epoxy resin or other thermosetting resin monomers or prepolymers and other thermoplastic resin has excellent heat resistance, moisture resistance, chemical resistance, electrical properties, flexibility, resistance to general purpose organic solvents, such as acetone, methyl ethyl ketone toluene and the like and storage stability.

This invention relates to an adhesive composition comprising:
(A) At least one cyanate ester compound selected from the group consisting of:
  (i) polyfunctional aromatic cyanate ester monomers having the formula $$R-O-C \equiv N)_n$$

wherein n is integer of 2-10 and R is an aromatic organic group, the cyanate groups being bonded to an aromatic ring or said aromatic organic group,
  (ii) homoprepolymers of (i) and
  (iii) coprepolymer of (i) and an amine, and optionally
(D) at least one thermosetting resin monomer or prepolymer, characterized in that the composition contains
(B) at least one thermoplastic, saturated polyester resin which is non-crystalline, substantially non-crystalline or of low crystallinity.

The invention also relates to an adhesive sheet comprises a release film or sheet and the above composition coated on the film or sheet.

DETAILED DESCRIPTION OF THE INVENTION

By "polyfunctional cyanate ester (A)" is meant a compound having at least two cyanate groups in its molecule. The polyfunctional cyanate ester is represented by the formula $$R-O-C \equiv N) \qquad (i)$$

wherein R is an aromatic nucleus-containing residue having 1–10 benzene rings selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R_2$ and $R_3$ are the same or different and each represents a hydrogen atom or an alkyl group containing 1 to 4 carbon atoms,

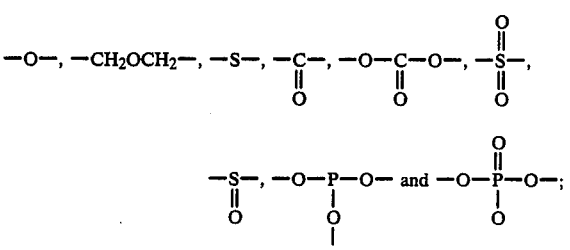

said aromatic nucleus is optionally substituted by a substituent selected from the group consisting of alkyl groups containing 1 to 4 carbon atoms, alkoxy groups, containing 1 to 4 carbon atoms, chlorine and bromine; n is in an integer of at least 2 and preferably 2-10, and the cyanate group is always directly bonded to the aromatic nucleus.

Examples of the polyfunctional cyanate ester include 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)-propane, 2,2-bis(3,5-dibromo-4-cyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak (U.S. Pat. Nos. 4,022,755, 3,448,079 etc.); cyanated bisphenol type polycarbonate oligomer derived from bisphenol type polycarbonate oligomer (U.S. Pat. No. 4,026,913) and mixture thereof. Other cyanate esters employed in the practice of this invention are given in U.S. Pat. Nos. 3,553,244; 3,755,402; 3,740,348, 3,595,900; 3,694,410 and 4,116,946 and BP Nos. 1,305,967 and 1,060,933 which are incorporated herein by reference. Of these cyanate esters, divalent cyanate ester compounds which are derived from divalent phenols, have symmetric structure and do not have any condensed ring in their bridging portion, such as, for example, 2,2-bis(4-hydroxyphenyl)propane, are preferable, because they are commercially available and give cured product having excellent properties. Polycyanate compounds obtained by reacting a phenolformaldehyde precondensate with a halogenated cyanide are also satisfactory. The above-mentioned cyanate esters may be used as mixtures.

Prepolymers may be used containing a sym-triazine ring which is prepared by the trimerization of the cyanate groups of the cyanate ester, and which have a number average molecular weight of 300 to 6,000. Such prepolymers can be prepared by polymerizing the above cyanate esters in the presence or absence of, as a catalyst, an acid such as a mineral acid or Lewis acid, a base such as sodium hydroxide, a sodium alcoholate or a tertiary amine, a salt such as sodium carbonate or lithirium chloride, or phosphate esters, such as tributyl phosphine.

The polyfunctional cyanate ester can be used in the form of a mixture of the monomer and the propolymer. For example, many of the commercially available cyanate esters derived from bisphenol A and cyanogen halide are in the form of mixtures of cyanate monomers and prepolymers, and such materials can also be used in the present invention.

Polyfunctional maleimide compounds which can be employed as one of component (D) have at least 2 maleimide groups in the molecule and are represented by the following general formula

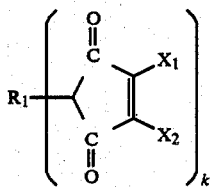

(ii)

wherein $R_1$ represents an aromatic or aliphatic organic group having a valence of k, $X_1$ and $X_2$ are the same or different and are independently a hydrogen atom, halogen atom or lower alkyl group and k is an integer of at least 2 and preferably an integer of 2-10. Oligomers or prepolymers derived from the above maleimide compounds may be used as the maleimide compound. Polyvalent, aromatic or aliphatic organic groups represented by $R_1$ in formula (i) include the following:
(i) aliphatic or alicyclic hydrocarbon groups having 4-16 carbon atoms,
(ii) polyvalent groups derived from aromatic hydrocarbons having benzene or naphthalene ring, such as benzene, xylene or naphthalene,
(iii) polyvalent groups derived from compounds in which at least 2 benzene rings are directly bonded, such as biphenyl,
(iv) aromatic ring-containing groups resulting from bonding of a plurality of benzene rings either directly or through a bridging member, represented by the formula

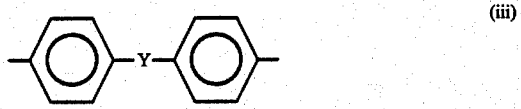

(iii)

wherein Y represents a linear, branched or cyclic aliphatic hydrocarbon group having 1 to 14 carbon atoms, aromatic hydrocarbon group, such as a phenylene group, a xylylene group, an oxygen atom, a sulfur atom, a carbonyl group, a sulfonyl group, a sulfinyl group, an alkyleneoxyalkylene group a phosphonyl group, a phosphinyl group or an imino group,
(v) melamine residues, and
(vi) residues of polynuclear product of benzene obtained by reacting aniline with formaldehyde, generally residues of polynuclear product having 2-10 benzene rings.

The maleimides represented by the above formula (i) can be produced by a method known per se which involves reacting maleic anhydride with divalent or more polyamine having at least 2 amino groups to form a maleamide acid, and then dehydro-cyclizing the maleamide acid. The maleimide can be produced by known methods per se.

Examples of polyfunctional maleimide include 1,3- or 1,4-dimaleimide benzene, 1,3- or 1,4-bis(maleimido methylene) benzene, 1,3- or 1,4-dimaleimido cyclohexane, 1,3- or 1,4-bis(maleimidomethylene)cyclohexane, 4,4-dimaleimido biphenyl, bis(4-maleimidophenyl)methane, bis(4-maleimidophenyl)ether, bis(4-maleimidophenyl)sulfone, bis(4-maleimido-3-methylphenyl) methane, bis(4-maleimido-3-chlorophenyl)methane, bis(4-maleimido-3,5-dimethylphenyl)methane, [2,2-bis(4-maleimido-3-methylphenyl)propane,] 2,2-bis(4-maleimido-3,5-dibromophenyl) propane, bis(4-maleimidophenyl)phenylmethane, 3,4-dimaleimidophenyl- 4'maleimidophenylmethane, 1,1-bis(4-maleimidophenyl)-1-phenyl-methane, maleimide derived from melamine and meleimide derived from addition product of formaldehyde and an aniline in which two or more benzene rings bond through methylene group.

The diamines include aromatic diamines, alicyclic diamines aliphatic diamines. Aromatic diamines are preferable, because the resulting object product have excellent heat resistance. When an alicyclic diamine is used the object products having flexibility. Primary diamines are more preferable to secondary diamines.

Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(4-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl) propane, 2,2-bis(3,5-dibromo-4-aminophenyl)-propane, bis(4-aminophenyl)phenylmethane, 3,4-diaminophenyl-4'-aminophenylmethane and 1,1-bis(4-aminophenyl)-1-phenylethane, bis(4-aminophenyl)-diphenyl silane, bis(4-aminophenyl)methyl phosphoneoxide, bis(4-aminophenyl)methyl phosphoneoxide, bis(4-aminophenyl)phenyl phosphineoxide, 2,4-diamino-6-phenyl-1,3,5-triazine(benzoguanamine), methylguanamine and butylguanamine.

Epoxy resins which can be used as one of component (D) are given in U.S. Pat. Nos. 3,562,214 and 4,110,364 which are incorporated herein by reference.

Examples of the epoxy resins include bisphenol A type epoxy resin, bisphenol F type epoxy resin, phenol novolak type epoxy resin, cresol novolak type epoxy resin, halogenated bisphenol A type epoxy resin, halogenated phenol novolak type epoxy resin, alicyclic epoxy resin, hydrogenated bisphenol A diglycidyl ether, triglycidyl isocyanurate, tetraglycidyl-4,4'-diaminophenyl methane, triglycicyl ether of tris(hydroxyphenyl) and the like.

In general, compound (D) may be added in amount of less than 60% on the total weight of components (A) and (D).

The thermoplastic saturated polyester resins (B) which are non-crystalline, substantially non-crystalline or of low crystallinity may be condensate of an aromatic or aliphatic dicarboxylic acid and an aliphatic or alicyclic polyol or prepolymer thereof.

The number average molecular weight of the polyester calculated on the basis of terminal functional groups of the polyester resin may be in the range of from 1,500 to 25,000 and preferably from 5,000 to 22,000. The polyester with the number average molecular weight of the above range are compatible with component (A). The hydroxy value of the polyester resin may be in the range of from 1 to 30 mg KOH/g. If the polyester resin has excess amount of free hydroxy group or carboxyl group, the hydroxyl group or carboxyl group reacts with the cyanate group of (A) gradually. As a result, the resin composition can not be stored for a long time.

Example of the dicarboxylic acids constituting the polyester resin include terephthalic acid, isophthalic acid, malonic acid, succinic acid, adipic acid, pimeric acid, suberic acid, azelaic acid, sebacic acid, and lower alkyl esters, or acid anhydrides of these acids and thermal decomposition products of carboxyl-terminated saturated polyester resins.

Examples of the polyols or prepolymer of the diols constituting the polyester resin include ethylene glycol, propylene glycol, 1,3-propanediol, 1,4-butenediol, 1,5-pentanediol, 1,6-hexanediol, neopentylglycol, diethylene glycol, triethylene glycol, polyethylene glycol, polypropylene glycol, polybutylene glycol, polycaprolactone diol, 2,2-dimethylpropanediol, 2,2-bis(4-hydroxycyclohexyl)propane, 1,4-dihydroxymethyl cyclohexane, trimethylol propane, 1,2,3-trihydroxypropane, tetramethylol methane, and the like.

The polyesters obtained by reacting one of dicarboxylic acids with one of polyols are necessarily crystalline. In order to obtain polyesters which are non-crystalline, substantially non-crystalline or of low crystallinity, combination of two or more dicarboxylic acids and one or more polyol, or combination of one or more dicarboxylic and two polyols are necessary. In general, polyesters having repeating units of homogeneous monomers are crystalline. When small amount of monomer haveing different structure is allowed to exist into repeating units of homogeneous monomers, some of the resulting polyesters is non-crystalline. Processes for producing polyesters which are non-crystalline, substantially non-crystalline or of low crystallinity are well known to those skilled in the art.

Polyesters which are non-crystalline or substantially non-crystalline (i.e. essentially amorphous), are preferable in the practice of the present invention.

Polyester which is commercially available from Nippon Synthetic Chemical Industry under name of POLYESTER is usable in the present invention.

The proportion of component (A) to component (B) is not critical. In general, the ratio of (A) to (B) may be in the range of from 10:90 to 99:1, more preferably 40:60 to 99:1 and most preferably from 50:50 to 95:5. In case of coating the resin composition on a release film or sheet it is preferable that component (B) is used in amount of from 15 to 40% by weight.

Method of mixing component (A) and component (B) or components (A) and (D), and component (B) is not critical. In general, solution of (A) or (A) and (D) in an organic solvent is prepared, and then to the solution is added (B) or solution of (B). Alternatively, (A), or (A) and (D) free from a solvent and (B) free from a solvent may be mixed in fusing state. An organic solvent or a reactive diluent may be added to the mixture of (A) and (B), or (A), (D) and (B) free from a solvent. Preliminary reaction of the mixture of (A) and (B), or (A) (D) and (B) may be effected. The resin compositions in solution, liquid or paste can be prepared.

The resin composition of this invention may be coated on a release film or sheet. The resin-coated film or sheet may be dried at 100°–150° C. for 2 minutes–1 hour until uncured resin free from a solvent or B-stage prepolymer can be obtained.

Examples of the release films or sheets include release paper, fluoroethylene propylene film, and the like.

Reticulation of the curable resin composition produced according to this invention may occur by heating.

A curable resin composition of the present invention may contain a catalyst or catalysts in amount of several percent for the purpose of accelerating reticulation.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogene-N,N-dimethylaniline, 2-N-ethylanilino ethanol, tri-n-butylamine, pyridine, quinoline, N-methylvorpholine, triethanolamine, triethylenediamine, N,N,N',N'-tetramethylbutanediamine, N-methylpiperidine; phenols, such as phenol, cresol, xylenol, resorcine, and phloroglusin; organic metal salts, such as lead naphthanate, lead stearate, zinc naphthanate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzyol peroxide and di-t-butyl diperphthalate; acid anhydrides, such as maleic anhydride, phthalic anhydride, lauric anhydride, pyromellitic anhydride, trimetllitic anhydride, hexahydrophthalic anhydride, hexahydropyromellitic anhydride and hexahydrotrimellitic anhydride; azo compounds, such as azoisobutylonitrile, 2-2'-azobispropane, m,m'-azoxystyrene, hydrozones, and mixtures thereof.

A variety of the additives, reinforcing agents and fillers can be added to the curable resin as component (C) as long as they do not impair the nature of the curable resin or the cured product. Examples of these additives include natural resins, such as rosin, shellac, copal, oil-modified rosin and the like; acrylate or methacrylate esters or prepolymers thereof, such as esters of a monofunctional or polyfunctional hydroxy compound and acrylic methacrylic acid and alkenyl esters of acrylic or methacrylic acids; polyallyl compounds or prepolymers thereof, such as diallyl phthalate, divinyl benzene and trialkenyl isocyanurate; dicyclopentadiene or prepolymer thereof; phenol resins; polyvinyl acetal resins, such as polyvinyl formal, polyvinyl acetal and polyvinyl butyral; phenoxy resins; acrylic resins having OH group or COOH group; silicone resins; alkyl resins; petroleum resins; low molecular liquid - high molecular elastic rubbers, such as polybutadiene, butadiene-acrylonitrile copolymer, polychloroprene, butadiene-styrene copolymer, polyisoprene, butyl rubber and natural rubbers; vinyl polymers, such as polyethylene, polypropylene, polybutene, poly-4-methylpentene-1, polyvinyl chloride, polyvinylidene chloride, polystyrene, polyvinyl toluene, polyvinyl phenol, AS resin, ABS resin, MBS resin, poly-4-fluorinated ethylene, fluorinated ethylenepropylene copolymer, tetrafluoroethylene-herafluoroethylene copolymer, polyfluorinated vinylidene; resins, such as polycarbonate, polyester carbonate, polyphenylene ether polysulfone, polyester sulfone, polyamide, polyadomide, polyester imide, and polyphenylene sulfide.

A variety of reinforcing agents or fillers may be added to the curable resins of this invention. Examples of reinforcing agents or filler include glass cloths, such as cloth, roving cloth, chopped mat, and surfacing mat; inorganic fibers, such as silica glass cloth, carbon fiber cloth, asbestos, rockwool, and slag wool; synthesis fiber cloths, such as aromatic polyamide cloth, textile blends of glass fibers and aromatic polyamide fiber, acryl, vinylon, polyester, polyamide, and polyimide; natural or semi-synthesis fiber cloths or paper, such as cotton cloth, flax, felt, craft paper, cotton paper, paper composed of pulp and glass fibers, semi-carbon fibers; chops of fibers constituting these cloths or paper; and inorganic materials, such as glass bulb, glass powder, silica, alumina, silica alumina, aluminum hydroxide, asbestos, calcium carbonate, calcium silicate, graphitecarbon, carbon black, kaolin clay, baked kaolin, mica, talk, aluminum, copper, iron, iron oxides, synthesis mica, natural mica, semiconductor, boron nitride, ceramics and the like.

Dye stuffs, pigments, thickners, lubricants, coupling agents, flame-retardant, self-extinguishing agents, and the like may be added to the curable resin.

The temperature for curing the curable resin composition depends on the presence or the absence of a catalyst and the kind and the proportion of components constituting the resin composition. In general, the temperature may be in the range of 100°-300° C. It is preferable that the composition is heated under pressure. The pressure may be in the range of from 0.1 to 500 Kg/cm$^2$ and preferably from 50 to 150 Kg/cm$^2$.

Laminate films or sheets and plates can be prepared from the resin composition of the present invention. The resin composition can be used as adhesive for metals, iron, aluminum, stainless steel, nickel and copper; and plastic films or sheets, such as polyimide film, polyester film, and the like. The resin compositions can be used as heat-resistant adhesives.

The present invention is further illustrated by the following non-limiting Examples and Control Runs.

All percentages and parts in these Examples and Control Runs are by weight, unless otherwise specified.

EXAMPLE 1

2,2-Bis(4-cyanatophenyl)propane (750 parts) was prepolymerized at 160° C. for 4 hours. Thermoplastic, saturated polyester resin, which is either non-crystalline or of low crystallinity, (Nippon Synthetic Chemical Industry Co., Ltd., Polyester LP 035) having number average molecular weight of 16,000 calculated on the basis of terminal functional group, and hydroxy value of 6 mg KOH/gram (250 parts) and bisphenol A type epoxy resin (Oil Chemical Shell Co., ltd., Epikote 828) (50 parts) were added to the prepolymer. Methyl ethyl ketone (MEK) was added to the mixture to obtain a solution with resin content of 60%. The solution is called Varnish (a).

Zinc octoate (catalyst) (0.12 parts) was added to Varnish (a). The resulting solution was coated on silicone layer (150 μm) coated release paper, and dried to obtain an adhesive sheet with B-staged resin layer 40 μm thick.

Polyimide file (Du Pont; Kapton) 125 μm thick was place on the adhesive layer of the sheet and pressed with heat roll of 120° C. The release paper was removed to transfer the adhesive layer from the release paper to the polyimide film. Copper foil 35 μm thick was placed on the adhesive layer of the polyimide film and pressed with stainless steel plate, and then laminate-molded at 175° C. and 30 Kg/cm$^2$ for 2 hours to obtain copper-clad film.

Physical and chemical tests of the film were effected. The results are shown in Table 1.

EXAMPLE 2

1,4-Cyanatobenzene (450 parts) was prepolymerized at 160° C. for 4 hours. Thermoplastic, saturated polyester resin, which is either non-crystalline or of low crystallinity (Nippon Synthetic Chemical Industry Co., Ltd., Polyester LP 035) having number average molecular weight of 16,000 calculated on the basis of terminal functional group and hydroxy value of 6 mg KOH/gram (550 parts) and saturated polyester resin (Nippon Synthetic Chemical Induustry Co., Ltd., Polyester LP 044) having number average molecular weight of 7,000 and hydroxy value of 15 mg KOH/g (100 parts) were added to the prepolymer. MEK was added to the mixture to obtain a solution with resin content of 60%. The solution is called Varnish (b).

Zinc octoate (catalyst) (0.07 parts) was added to Varnish (b). The resulting solution was coated on silicone layer (150 μm) coated release paper, and dried to obtain an adhesive sheet with B-staged resin layer 35-40 μm thick.

Polyimide film (Du Pont; Kapton) 100 μm thick was place on the adhesive layer of the sheet and pressed with heat roll of 120° C. The release paper was removed to transfer the adhesive layer from the release paper to the polyimide film. Copper foil 35 μm thick was placed on the adhesive layer of the polyimide film and pressed with stainless steel plate, and then laminate-molded at 175° C. and 30 Kg/cm² for 2 hours to obtain copper-clad film.

Physical and chemical tests of the film were effected. The results are shown in Table 1.

COMPARATIVE RUN 1

The procedure of Example 1 was repeated except that only the polyester resin of Example 1 was used as a resin component. The results are shown in Table 1.

COMPARATIVE RUN 2

The procedure of Example 2 was repeated except that the polyester resins were not used. The results are shown in Table 1.

EXAMPLES 3 AND 4

Varnish (a) and Varnish (b) of Examples 1 and 2 were stored at 30° C. for 90 days. The test of storage stability was effected. The results are shown in Table 2.

Copper foil-clad films were prepared in the same way as in Example 1 by using Varnish (a) and Varnish (b) after storing for 90 days. The results are shown in Table 1.

EXAMPLE 5

2,2-Bis(4-cyanatophenyl)propane (675 parts) and bis(4-maleimidephenyl)methane (75 parts) were prepolymerized at 160° C. for 2 hours. Theremoplastic, saturated polyester resin, which is either non-crystalline or of low crystallinity (Nippon Synthetic Chemical Industry Co., Ltd., Polyester LP 035) having number average molecular weight of 16,000 calculated on the basis of terminal functional group, and hydroxy value of 6 mg KOH/gram (250 parts) and bisphenol A type epoxy resin (Yuka Shell Epoxy Co., Ltd., Epikote 828) (50 parts) were added to the prepolymer. MEK was added to the mixture to obtain a solution with resin content of 60%. The solution is called Varnish (c).

Zinc octoate (catalyst) (0.12 parts) was added to Varnish (a). Varnish (a) was coated on silicone layer (150 μm) coated release paper, and dried to obtain an adhesive sheet with B-staged resin layer 40 μm thick.

Polyimide film (Du Pont; Kapton) 125 μm thick was place on the adhesive layer of the sheet and pressed with heat roll of 120° C. The release paper was removed to transfer the adhesive layer from the release paper to the polyimide film. Copper foil 35 μm thick was placed on the adhesive layer of the polyimide film and pressed with stainless steel plate, and then laminate-molded at 175° C. and 30 Kg/cm² to obtain copper-clad film.

Physical and chemical tests of the film were effected. The results are shown in Table 2.

EXAMPLE 6

1,4-Cyanatobenzene (382 parts) and bis(4-maleimidephenyl)ether (68 parts) were prepolymerized at 160° C. for 1.5 hours. Thermoplastic, saturated polyester resin, which is either non-crystalline or of low crystallinity (Nippon Synthetic Chemical Industry Co., Ltd., Polyester LP 035) having number average molecular weight of 16,000 calculated on the basis of terminal functional group and hydroxy value or 6 mg KOH/gram (550 parts) and saturated polyester resin (Nippon Synthetic Chemical Industry Co., Ltd., Polyester LP 044) having number average molecular weight of 7,000 and hydroxy value of 15 mg KOH/g (100 parts) were added to the prepolymer. MEK was added to the mixture to obtain a solution with resin content of 60%. The solution is called Varnish (d).

Zinc octoate (catalyst) (0.07 parts) was added to varnish (d). The resulting solution was coated on silicone layer (150 μm) coated release paper, and dried to obtain an adhesive sheet with B-staged resin layer 35-40 μm thick.

Polyimide film (Du Pont; Kapton) 100 μm thick was place on the adhesive layer of the sheet and pressed with heat roll of 120° C. The release paper was removed to transfer the adhesive layer from the release paper to the polyimide film. Copper foil 35 μm thick was placed on the adhesive layer of the polyimide film and pressed with stainless steel plate, and then laminate-molded at 175° C. and 30 Kg/cm² for 2 hours to obtain copper-clad film.

Physical and chemical tests of the film were effected. The results are shown in Table 1.

COMPARATIVE RUN 3

The procedure of Example 5 was repeated except that only the polyester resin of Example 5 was used as a resin component. The results are shown in Table 1.

COMPARATIVE RUN 4

The procedure of Example 6 was repeated except that the polyester resins were not used. The results are shown in Table 1.

EXAMPLES 7 AND 8

Varnish (c) and Varnish (d) of Examples 5 and 6 were stored at 30° C. for 90 days. The test of storage stability was effected. The results are shown in Table 2.

Copper foil-clad films were prepared in the same way as in Example 5 by using Varnish (a) and Varnish (b) after storing for 90 days. The results are shown in Table 1.

TABLE 1

| Example or Comparative Run | | Ex. 1 | Ex. 2 | Ex. 3 | Ex. 4 | Comp. Ex. 1 | Comp. Ex. 2 | Ex. 5 | Ex. 6 | Ex. 7 | Ex. 8 | Comp. Ex. 3 | Comp. Ex. 4 |
|---|---|---|---|---|---|---|---|---|---|---|---|---|---|
| Peel strength | 25° C. | 2.4 | 2.7 | 2.4 | 2.7 | 2.2 | 1.1 | 2.3 | 2.7 | 2.3 | 2.7 | 2.2 | 1.0 |
| of copper | 150° C. | 1.7 | 1.3 | 1.8 | 1.3 | 0 | 0.1 | 1.8 | 1.5 | 1.9 | 1.6 | 0 | 0.2 |
| foil | 180° C. | — | 0.6 | — | 0.5 | 0 | — | — | 0.7 | — | 0.8 | 0 | — |
| Kg/cm | 200° C. | 0.9 | — | 0.9 | — | — | 0* | 1.0 | — | 1.0 | — | — | 0* |
| Solder resistance | | o | o | o | o | x | x | o | o | o | o | x | x |
| Flexing characteristics | | o | o | o | o | o | x | o | o | o | o | o | x |
| solvent resistance | TCE | o | o | o | o | Δ | o | o | o | o | o | Δ | o |
| | MEK | o | o | o | o | x | o | o | o | o | o | x | o |
| | toluene | o | o | o | o | x | o | o | o | o | o | x | o |
| Surface resistance | | 1.4 | 0.65 | 2.0 | 0.40 | 0.03 | 5.0 | 1.1 | 0.7 | 1.7 | 0.52 | 0.03 | 4.0 |

TABLE 1-continued

| Example or Comparative Run | Ex. 1 | Ex. 2 | Ex. 3 | Ex. 4 | Comp. Ex. 1 | Comp. Ex. 2 | Ex. 5 | Ex. 6 | Ex. 7 | Ex. 8 | Comp. Ex. 3 | Comp. Ex. 4 |
|---|---|---|---|---|---|---|---|---|---|---|---|---|
| ($\Omega \times 10^{12}$) | | | | | | | | | | | | |

Note:
Solder Resistance ... The sample was floated on melt solder at 260° C. for 20 seconds. "O" ... No damage; "X" ... blister Flexing characteristics ... Copper foil was removed from the sample by etching. Metal wire having diameter of 1 mm was wound around the resin plate. Whether or not the plate was broken was observed. "O" ... no damage "X" ... craze Solvent resistance ... The sample was immersed in each of 1,1,1-trichloroethane, MEK and toluene. Appearance was observed. "O" ... no damage, "Δ" ... slight change "X" ... great change Surface resistance ... According to JIS C 6481 C-90/20/65+C-96/40/90 treatment

*means that copper foil was peeled from the polyimide film.

TABLE 2

| | | Varnish (a) of Ex. 3 | Varnish (b) of Ex. 4 | Varnish (c) of Ex. 7 | Varnish (d) of Ex. 8 |
|---|---|---|---|---|---|
| | | Viscosity (CPS) at 30° C. | | | |
| Storage | 0 | 15,300 | 23,000 | 16,600 | 24,300 |
| time | 10 | 15,400 | 23,200 | 16,700 | 24,300 |
| (day) | 20 | 15,600 | 23,300 | 16,700 | 24,500 |
| | 30 | 15,900 | 23,300 | 16,700 | 24,500 |
| | 60 | 16,500 | 23,500 | 16,900 | 24,700 |
| | 90 | 16,800 | 24,000 | 17,100 | 24,800 |

The following components were used in the following Examples and Comparative run:

Thermosetting Resin A ... Prepolymer obtained by heating 2,2-bis(4-cyanatophenyl)propane at 160° C. for 3 hrs.

Thermosetting Resin B ... Prepolymer obtained by heating 2,2-bis(4-cyanatophenyl)propane and bis(4-maleimidophenyl)methane (638:113) at 160° C. for 1.5 hrs.

Polyester Resin C ... Nippon Synthetic Chemical Industry Co., Ltd.; Polyester LP-035 having number average molecular weight of 16,000 hydroxy value of 6 mg KOH/g Polyester Resin D ... Nippon Synthetic Chemical Industry Co., Ltd.; Polyester LP-011 having number average molecular weight of 16,000, hydroxy value of 6 mg KOH/g and density of 1.21

Polyester Resin E ... Nippon Synthetic Chemical Industry Co., Ltd.; Polyester SP-170 having number average molecular weight of 19,000, hydroxy value of 5 mg KOH/g and density of 1.32

Polyepoxy Resin F ... Yuka Shell Epoxy Co., Ltd.; Epikote 828

Thermoplastic Resin G ... Acrylonitrile-butadiene copolymer

Thermoplastic Resin H ... Thermoplastic polyurethane.

EXAMPLE 9

Component A (70 parts) and component C (30 parts) were mixed. Mixed solvent of MEK and toluene (1:1) was added to the mixture to obtain varnish with resin content of 60%.

Iron acetylacetonate (0.01 part) was added to the varnish. The resulting solution was coated on two aluminum plates 2.5 mm thick, and dried. The two plates piled up to face the coated surfaces thereof, and were fastened by clip, and then heated at 170° C. for 1 hr. to cure the resin component. Adhesive strength under shear of the resulting plate was measured. The results are shown in Table 3.

EXAMPLES 10–20 AND COMPARATIVE RUN 9–12

The procedures of Example 9 were repeated by using components given in Table 3. The result are shown in Table 3.

TABLE 3

| Ex. or Comp. Ex. | A | B | C | D | E | F | G | H | Adhesive strength under shear Kg/cm² 25° C. | 150° C. |
|---|---|---|---|---|---|---|---|---|---|---|
| Ex. 9 | 70 | | 30 | | | | | | 250 | 125 |
| Ex. 10 | 70 | | | 30 | | | | | 218 | 102 |
| Ex. 11 | 70 | | | | 30 | | | | 201 | 93 |
| Comp. 9 | 70 | | | | | 30 | | | 165 | 70 |
| Comp. 10 | 70 | | | | | | | 30 | 180 | 83 |
| Ex. 12 | 70 | | 25 | | | | | | 310 | 246 |
| Ex. 13 | 70 | | | 25 | | | | | 250 | 212 |
| Ex. 14 | 70 | | | | 25 | | | | 227 | 194 |
| Ex. 15 | | 70 | 30 | | | | | | 240 | 120 |
| Ex. 16 | | 70 | | 30 | | | | | 220 | 100 |
| Ex. 17 | | 70 | | | 30 | | | | 200 | 95 |
| Comp. 11 | | 70 | | | | 30 | | | 160 | 70 |
| Comp. 12 | | 70 | | | | | | 30 | 180 | 85 |
| Ex. 18 | | 70 | 25 | | | | | | 305 | 240 |
| Ex. 19 | | 70 | | 25 | | | | | 250 | 210 |
| Ex. 20 | | 70 | | | 25 | | | | 230 | 200 |

EXAMPLE 21

2,2-Bis(4-cyanatophenyl)propane (200 parts) and Polyepoxy Resin F (5 parts) were prepolymerized at 150° C. for 3 hours. Polyester Resin C (140 parts) and maleic acid-addition 1,2-polybutadiene in which maleic anhydride is bonded to C—C double bond (Nippon Soda Co., Ltd.; BN-1010) having molecular weight of 1,000 and acid value of 110 (5 parts) were mixed with the prepolymer. MEK was added to the mixture to obtain resin solution with resin level of 40%. Finely divided silica (Nippon Aerogil Co., Ltd.; R-202) (4 parts) was added to the solution to form varnish (l).

Zinc octoate (0.16 parts) and 1,1-bis(tertiary-butylperoxy) 3,3,5-trimethylcyclohexane (0.3 parts) were added to varnish (e). The resulting solution was coated on polyimide film, and dried at 120° C. for 5 minutes. Copper foil 35 μm thick was placed on the adhesive surface of the film, and press-molded at 170° C. for 50 minutes at 20 Kg/cm² to obtain copper foil-clad film. The physical and chemical tests of the film were effected. The results are shown in Table 4.

EXAMPLE 22

2,2-Bis(4-cyanatophenyl)propane (190 parts), bis(4-maleimidophenyl)methane (10 part) and Polyepoxy Resin F (4 parts) were prepolymerized at 150° C. for 3 hrs.

Polyester Resin C was added to the prepolymer. MEK was added to the mixture to obtain varnish (f) with resin content of 40%. Copper-clad film was prepared in the same way as in Example 21 by using varnish (f). The results are shown in Table 4.

EXAMPLE 23

The prepolymer of Example 22, Polyester Resin C and the maleic acid-addition 1,2-polybutadiene of Example 21 were used as in Example 21 to obtain varnish (h).

Copper-clad film was prepared in the same way as in Example 21 by using varnish (h). The results are shown in Table 4.

TABLE 4

|  |  | Ex. 21 | Ex. 22 | Ex. 23 |
|---|---|---|---|---|
| Peel strength | 25° C. | 2.5 | 2.3 | 2.4 |
| of copper foil | 150° C. | 1.5 | 1.5 | 1.4 |
| (Kg/cm) | 200° C. | 0.5 | 0.6 | 0.5 |
| Solder resistance | | o | o | o |
| Flexing characteristics | | o | o | o |
| Solvent | TCE | o | o | o |
| resistance | MEK | o | o | o |
|  | Toluene | o | o | o |
| Surface resistance ($\Omega \times 10^{12}$) | | 1.0 | 1.0 | 1.0 |

What is claimed is:

1. An adhesive composition comprising:
   (A) at least one cyanate ester compound selected from the group consisting of:
   (i) polyfunctional aromatic cyanate ester monomers having the formula $$R-O-C\equiv N)_n$$

wherein n is integer of 2–10 and R is an aromatic organic group, the cyanate groups being bonded to an aromatic ring or said aromatic organic group;
   (ii) homoprepolymers of (i) and
   (iii) coprepolymer of (i) and an amine, and
   (D) at least one thermosetting resin monomer or prepolymer, characterized in that the composition contains
   (B) at least one essentially amorphous thermoplastic saturated polyester resin, said saturated polyester resin consisting essentially of a condensate of an aromatic or aliphatic dicarboxylic acid of the formula $$\overset{O}{\underset{HO-C-R-C-OH}{\|}}\overset{O}{\|}$$

wherein R is an aromatic or aliphatic hydrocarbon radical or an acid anhydride of said aromatic or aliphatic dicarboxylic acid, and an aliphatic or alicyclic polyol.

2. The composition of claim 1 wherein said thermosetting resin from the group consisting of:
   (i) polyfunctional maleimides compound from the group consisting of (i) a polyfunctional maleimides having 2 or more N-maleimide group per one molecule;
   (ii) homopolymers of (i); and
   (iii) coprepolymer of (i) and an amine.

3. The composition of claim 2 wherein said thermosetting resin further contains an epoxy resin.

4. The composition of claim 1 wherein the composition further contains (C) at least one thermoplastic resin other than (B) or inorganic filler or mixture thereof.

5. An adhesive sheet comprising a release film or sheet and the composition of claim 1 coated on the film or sheet.

6. An adhesive sheet comprising a release film or sheet and the composition of claim 4 coated on the film or sheet.

7. An adhesive sheet comprising a release film or sheet and the composition of claim 2, coated on the film or sheet.

* * * * *